United States Patent
Isomichi et al.

(10) Patent No.: US 6,633,225 B1
(45) Date of Patent: Oct. 14, 2003

(54) SELECTIVE GROUP PAGING DEVICE WITH EXCHANGEABLE GROUP ID

(75) Inventors: Yasuhiro Isomichi, Kanagawa (JP); Takayuki Komori, Kanagawa (JP); Shigeru Uchiyama, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/287,791

(22) Filed: Apr. 7, 1999

(30) Foreign Application Priority Data

May 14, 1998 (JP) .......................................... 10-148297

(51) Int. Cl.[7] .............................................. H04Q 7/08
(52) U.S. Cl. ..................... 340/7.46; 240/7.48; 240/7.1
(58) Field of Search ........................... 340/286.01, 7.46, 340/7.4, 7.54, 7.48, 7.1; 123/179.2

(56) References Cited

U.S. PATENT DOCUMENTS

| | | | | |
|---|---|---|---|---|
| 4,019,142 A | * | 4/1977 | Wycoff ...................... | 340/7.46 |
| 4,208,630 A | * | 6/1980 | Martinez ..................... | 340/7.1 |
| 4,417,246 A | * | 11/1983 | Agnor et al. ........... | 340/825.44 |
| 4,812,843 A | * | 3/1989 | Champion, III et al. ... | 340/7.48 |
| 5,043,718 A | * | 8/1991 | Shimura ..................... | 340/7.46 |
| 5,129,376 A | * | 7/1992 | Parmley ................... | 123/179.2 |
| 5,294,922 A | * | 3/1994 | Akahori ....................... | 340/7.4 |
| 5,705,995 A | * | 1/1998 | Laflin et al. ............... | 340/7.48 |
| 5,854,595 A | * | 12/1998 | Williams .................... | 340/7.54 |
| 5,966,068 A | * | 10/1999 | Wicks et al. ........... | 340/286.01 |

FOREIGN PATENT DOCUMENTS

| CN | 1133667 A | 10/1996 |
|---|---|---|
| CN | 1166756 A | 12/1996 |

\* cited by examiner

*Primary Examiner*—Michael Horabik
*Assistant Examiner*—Hung Dang
(74) *Attorney, Agent, or Firm*—Pearne & Gordon LLP

(57) ABSTRACT

A pager in which is written a paging ID shared among the remaining pagers of the same group, the pager including storage means for storing a character string; data comparing means for comparing the character string included in a received message with the data stored in the storage means; and operation execution means for commencing an operation on the basis of the result of the comparing operation performed by the data comparing means. The storage means is made interchangeable among pagers, or the data stored in the storage means can be rewritten. Categories of pagers in the same group may be readily established or changed through interchanging of the storage means or through rewriting of the data stored in the storage means.

1 Claim, 4 Drawing Sheets

| OBJECT OF CONTROL |
|---|
| *411 (AIR CONDITIONER) |
| CONTROL SIGNAL |
| 11111 (ON) |
| 22222 (OFF) |
| 3____ (TIMER SETTING) |
| ... |

| OBJECT OF CONTROL |
|---|
| *412 (LIGHTING) |
| CONTROL SIGNAL |
| 11111 (ON) |
| 22222 (OFF) |

| OBJECT OF CONTROL |
|---|
| *413 (VCR) |
| CONTROL SIGNAL |
| 11111 (ON) |
| 22222 (OFF) |
| 44444 (REPLAY) |
| 55555 (REWINDING) |
| ... |

SELECTIVE GROUP PAGING DEVICE WITH EXCHANGEABLE GROUP ID

BACKGROUND OF THE INVENTION

The present invention relates to a pager, and more particularly, to a pager designed so as to be able to respond selectively according to a message to be transmitted.

In the field of pagers there have been known two types of service: i.e., selective paging service and group paging service. Generally, selective paging is carried out while a unique ID of a pager is used as a paging ID. If there is a match between the paging ID stored in ID-ROM of the pager and paging ID information obtained through demodulation of a radio wave, paging is indicated to the user by means of beeping sound or vibration, and an incoming message is indicated on a liquid crystal display or the like.

In the case of group paging, an ID common among pagers of a certain group is used as a paging ID. When paging is carried out through use of the paging ID, all the radio paging receivers of the group concerned are paged. To receive this service, the pagers of the same group must collectively be contracted with a service provider.

Further, in Japanese Patent Application Laid-open No. 10-4578 is described a method of paging a plurality of specific pagers among the pagers constituting the group. Under this method, a message is used as a key to a paging operation.

As shown in FIG. 8, the pager comprises a radio section 101 for demodulating a radio signal; a CPU 102 for verifying operations; ID-ROM 103 in which paging IDs are stored; a display section 105 for indicating a received message; and a beeping section 104 for informing a user of an incoming message through use of beeping sound. The CPU 102 comprises an ID number storage section 107 for storing pager ID numbers and a message verification section 106 for verifying numerals included in the message against the receiver ID number.

In the foregoing pager, the radio section 101 receives a radio signal transmitted from a radio paging system base station and demodulates the thus-received radio signal. The CPU 102 verifies the paging IDs stored in the ID-ROM 103 against the received paging address. If there is a match between them, the numerals included in the message are compared with the receiver ID number stored in the ID number storage section 107. If there is a match between the numerals, the beeping section 104 and the display section 105 are controlled and activated so as to perform a paging operation.

Although the data stored in the ID-ROM 103 are common to the individual pagers in a certain group, each receiver ID number stored in the CPU 102 is different from the others. By use of such a configuration, the pager that is paged can be selected according to details of a message to be transmitted.

A conceivable way to use the pager is to utilize pagers by providing the pagers to, e.g., airline passengers at the air port, and by offering boarding information, such as boarding time or the location where the passengers are to congregate, to the passengers by means of the pagers.

In a case where the foregoing pagers are used in offering such boarding information, a flight number, for example, is stored in the CPU of each pager beforehand, and the pagers are provided to the passengers. As a result, the passengers are distinguished according to flight number, and boarding information can be offered to the individual passengers.

In this case, however, there must be prepared the pagers which have a flight number stored therein and are equal in number to the passengers. If there is a change in flight number or the number of passengers, the pagers may become insufficient or excessive in number, thus rendering use of the pagers inefficient.

Further, in a case where boarding information is sent to the passenger through distinctive paging, the passengers must be paged one by one, thus creating a great deal of inconvenience to the operator. In a case where boarding information is provided to the passengers through group paging, there can be avoided efforts to manage distribution of different kinds of pagers among passengers. However, since all the passengers are paged, each of the passengers must decide from a message whether or not boarding information is relevant to him. Further, since irrelevant paging is performed many times, the passengers feels inconvenienced.

In a case where passengers are classified into several groups and where paging is carried out on a per-group basis, there must be used pagers which are adjusted to each group and are equal in number to the passengers of the respective group. Thus, management of the number of pagers is troublesome. Further, in this case, pagers adjusted to a certain group cannot be used for another group, thus deteriorating the utilization efficiency of the pager.

SUMMARY OF THE INVENTION

The present invention is intended to solve the problems of the conventional pager, and the object of the present invention is to provide a pager which enables efficient paging of only a plurality of pagers concerned and which allows easy management of the number of the pagers.

Accordingly, the present invention provides a pager for use with a radio paging system which can page a plurality of pagers through use of one paging signal, the pager comprising: storage means for storing data; data comparing means for comparing message data included in the paging signal with the data stored in the storage means; and operation execution means for commencing a paging operation when, as a result of the comparing operation performed by the data comparing means, it turns out that there is a match between the data. The storage means is interchangeable among pagers, or the data stored in the storage means can be rewritten.

As mentioned above, since the message data received by the pager are used as a key to determining whether or not to commence a paging operation, persons who fall into a specific category within the same group can be paged. Categories may be established or changed by interchanging of the storage means or through rewriting of the data stored in the storage means.

Further, according to the present invention, the storage means is formed from a memory card. The category into which the pager falls can be established or changed by interchanging the memory card to be fitted to the pager or by rewriting the data stored in the memory card.

Still further, according to the present invention, the operation execution means commences a paging operation on the basis of the comparing result. Only the pagers which fall into a specific category within the same group are paged.

Furthermore, according to the present invention, the storage means is designed to store data including at least flight numbers of airplanes. Within the same group, pagers to be paged can be selected according to the flight number.

Furthermore, according to the present invention, the storage means is designed to store data regarding one controlled device which is an object of control and data representing control information. A control signal regarding one controlled device can be distinguished from the received information by comparing of these data sets with the character string of the received message.

Furthermore, according to the present invention, the operation execution means outputs a control signal related to the controlled devices stored in the storage means, on the basis of the comparing result. Individual pagers which fall into the same group are arranged so as to correspond to respective controlled devices, such as an air conditioner, a VCR, and lighting fixtures. As a result, these devices can be remotely controlled by means of the pagers.

Furthermore, according to the present invention, the pager is provided with external interface (I/F) means for outputting a control signal to the controlled devices, and the control signal generated by the pager is output to the controlled device by way of the external I/F (interface) means.

Furthermore, according to the present invention, the external I/F means outputs a connection standard signal for home automation equipment. A device having an external I/F compliant with home automation standards can be remotely controlled.

DETAILED DESCRIPTION OF THE PREFERRED EMBODIMENTS

Preferred embodiments of the present invention will now be described by reference to the accompanying drawings.

First Embodiment

Figure 1:
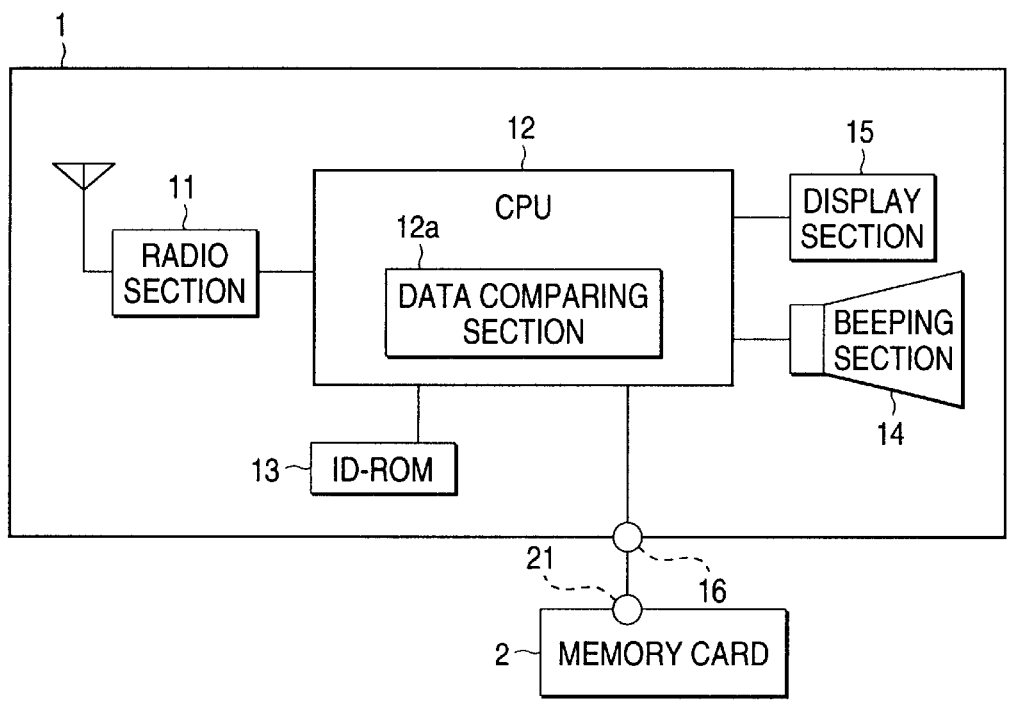
FIG. 1 is a block diagram showing the configuration of a pager according to a first embodiment of the present invention.

As shown in FIG. 1, a pager according to a first embodiment comprises a pager main unit 1 and a memory card 2 having check data recorded thereon. The memory card 2 can be fitted to and disconnected from the pager main unit.

The pager main unit 1 comprises a radio section 11 for demodulating a radio signal; a CPU 12 for performing a comparing operation; ID-ROM 13 having paging identifications stored therein; a display section 15 for indicating a received message; a beeping section 14 for communicating to a user through use of a beeping sound; and a connection section 16 to which a terminal 21 of the memory card 2 is attached. The CPU 12 comprises a data comparing section 12a for comparing received data with the data recorded in the memory card 2.

The memory card 2 measures, e.g., 12 mm long, 20 mm wide, and 1.2 mm thick and is formed on a plastic board in the form of a module, in which EEPROM is incorporated. The memory card 2 has the terminal 21 and is connected to the connection section 16 of the pager main unit 1.

In this pager, the radio section 11 receives a radio signal transmitted from a radio paging system base station, demodulates the thus-received radio signal, and sends the demodulated signal to the CPU 12. Operations of the CPU 12 are specified by a control program, and the data comparing means 12a is included in the control program.

First, the CPU 12 compares the data received from the radio section 11 with the paging ID stored in the ID-ROM 13 and checks whether or not there is a match between the data sets.

If there is a match between the data sets, the CPU 12 compares the data stored in the memory card 2 with the received message data.

Figure 2:
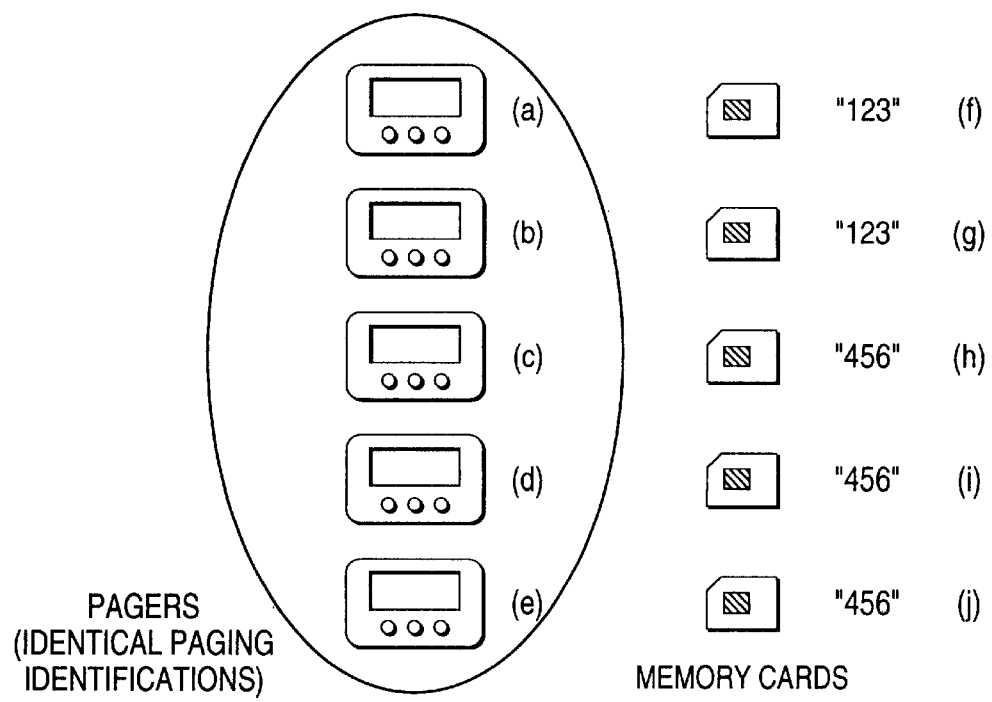
FIG. 2 is a pager and a memory card for group paging purposes according to the first embodiment.

The foregoing comparison operations will be described by reference to FIGS. 2 through 4. Pagers (a), (b), (c), (d), and (e) shown in FIG. 2 are assigned the same paging ID for group paging purposes. Data related to flight No. 123 and a passenger's name are stored in memory cards (f) and (g), and data of flight No. 456 and a passenger's name are recorded in memory cards (h) to (j).

At the airport counter, the memory card (f) is fitted to the pager (a), and the memory card (g) is fitted to the pager (b). Likewise, the memory card (h) is fitted to the pager (c); the memory card (i) is fitted to the pager (d); and the memory card (j) is fitted to the pager (e). When the passenger checks in at the airport counter, the pager is given to the passenger according to the flight number of the airplane.

Figure 4A:
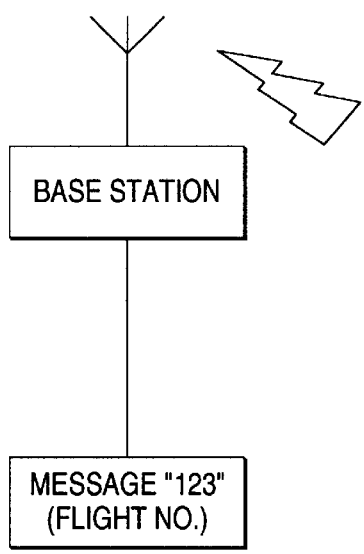
FIGS. 4A and 4B are schematic representations showing paging operations performed by the pager according to the first embodiment.
Figure 4B:
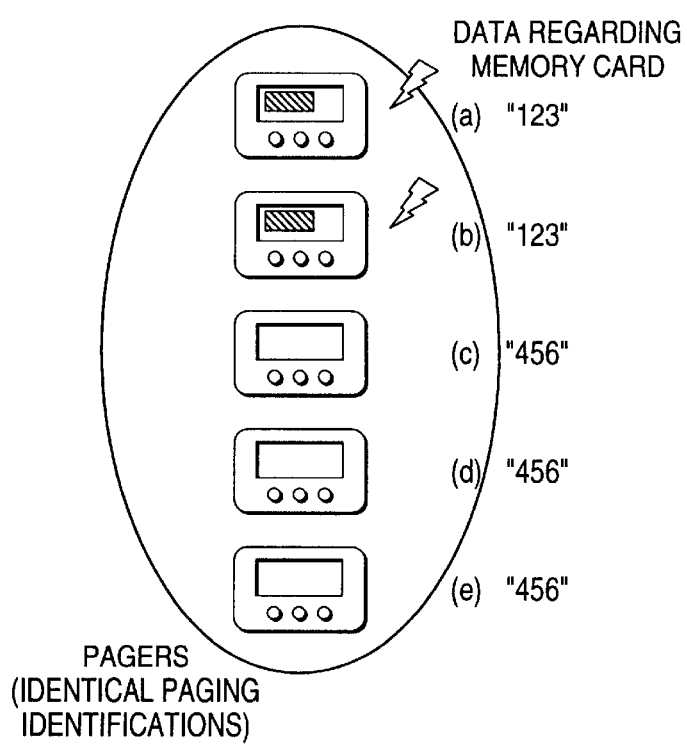

As shown in FIGS. 4A and 4B, when the boarding time of flight No. 123 has come, the operator enters the paging ID of the pagers and the data regarding flight No. 123, thereby paging the pagers. Since the same paging ID is used for the pagers (a) to (e), all the pagers receive the message. However, as shown in FIG. 4B, there are paged only the pagers (a) and (b), each of which has the memory card having the data including message ※123※ stored therein.

Figure 3:
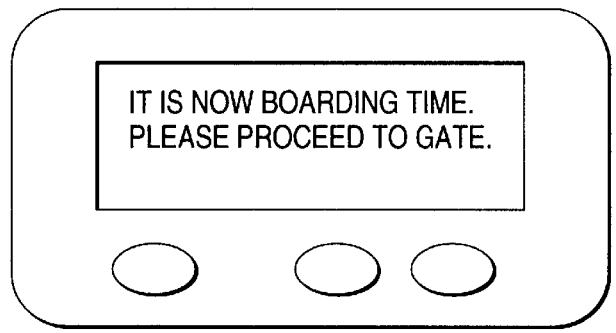
FIG. 3 is an example of a message display appearing on the pager according to the first embodiment.

As shown in FIG. 3, a message reading "Boarding time has come. Please come to the gate" is indicated together with a beeping sound. The passengers who have seen the message start boarding. At this time, the pagers of the passengers of flight No. 456 do nothing. If the passenger's name is included in the message, only the pager of the passenger identified by the name can be paged.

As mentioned above, the flight number of the airplane is stored as data in the memory card of the pager according to the first embodiment. By the operator transmitting the flight number as a message when a boarding time has come, only the pagers corresponding to the message are paged. In contrast, the pagers of the passengers of another flight number do nothing, and hence the passengers can await boarding without being annoyed by the irrelevant message.

This pager does not require the operator to manage the numbers assigned to the pagers or the number of groups, thereby rendering the management of pagers very easy.

With regard to a message to be indicated, it is desirable that a repetitive statement be stored beforehand according to the field of application. However, if the reasons why the holder of the pager is paged is clear for the holder, no message may be indicated or the transmitted message may be indicated as is.

In addition to the flight number and the passenger's name, a seat number may be recorded on the memory card. Further, the memory card may be used for information regarding the ticket. In this case, a way to use the pager such as that provided below may be conceivable. For example, during a wait for boarding, the passenger awaits paging while the memory card is attached to the pager. At the time of boarding, the passenger boards the airplane while the memory card is fitted to the ticket, and the pager is returned to the staff of the airline company at the boarding gate.

Further, if the memory card is rewritable in a non-contact manner, equipment for rewriting purpose is installed at the counter. When the pager having a memory card is handed to the passenger, the data written on the memory card may be rewritten. In this case, the data may be rewritten without involving removal of the memory card from the pager, and hence the memory card may be formed integrally with the pager.

Second Embodiment

With respect to a second embodiment, an explanation will be given of a case where pagers are attached respectively to an air conditioner, lighting fixtures, and a VCR and where these devices are remotely controlled by utilization of the pagers.

Figures 5, 6A, 6B, 6C:
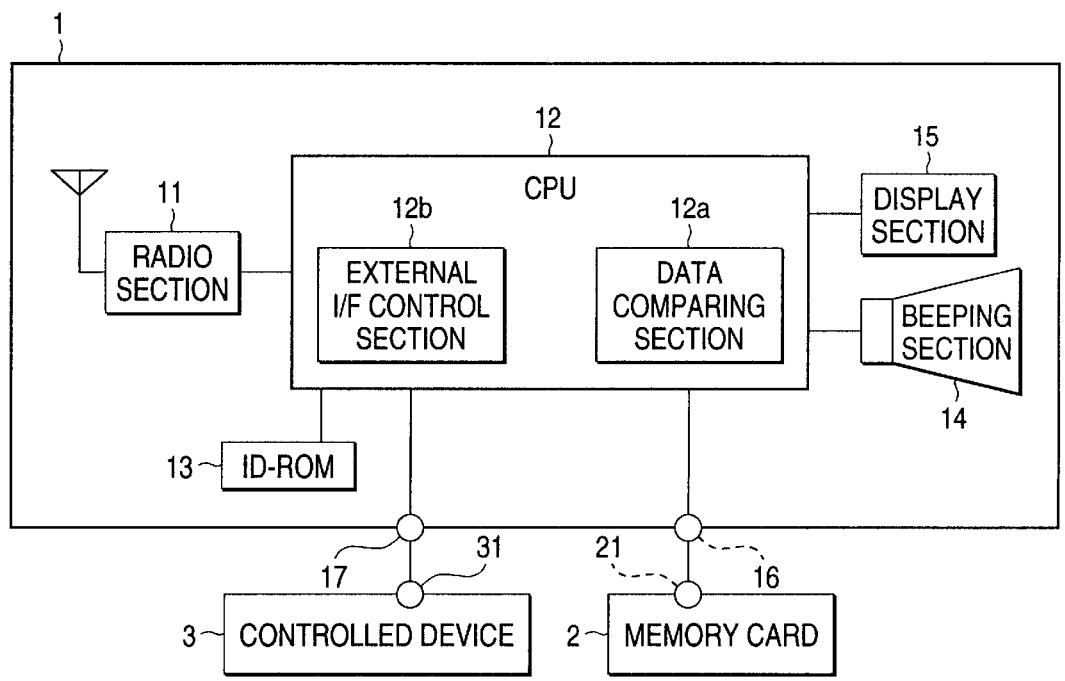
FIG. 5 is a block diagram showing the configuration of a pager including external interface (I/F) means according to a second embodiment of the present invention.
FIGS. 6A to 6C show examples of data maps recorded on a memory card of the pager according to the second embodiment.

As shown in FIG. 5, the pager comprises a pager main unit 1 to be connected to an external I/F 31 of a controlled device 3, and a memory card 2 in which are stored data for specifying the controlled device and a code of control information. The pager main unit 1 comprises a radio section 11 for demodulating a radio signal, a CPU 12 for performing a comparing operation and outputting a control signal on the basis of the result of such comparing; ID-ROM 13 having paging identification data stored therein; a display section 15 for indicating a received message; a beeping section 14 for informing the user of an incoming message by means of a beeping sound; a connection section 16 to which a terminal 21 of the memory card 2 is fitted; and an external I/F 17 for the purpose of controlling a device byway of which a control signal is output to the controlled device 3. The CPU 12 comprises a data comparing section 12a for comparing received data with the data recorded on the memory card 2, and an external I/F control section 12b for outputting a control signal on the basis of the comparing result.

As shown in FIGS. 6A to 6C, data representing devices to be controlled or a control signal are recorded on the memory card 2. FIG. 6A shows control information regarding an air conditioner to be controlled; FIG. 6B shows control information regarding a lighting fixture to be controlled; and FIG. 6C shows control information regarding a VCR to be controlled.

The external I/F 31 of the controlled device 3 and the external I/F 17 of the pager main unit 1 are electrically or optically connected together, and a control signal is transmitted to the external I/F 31 of the controlled device 3 from the external I/F 17.

Figure 7:
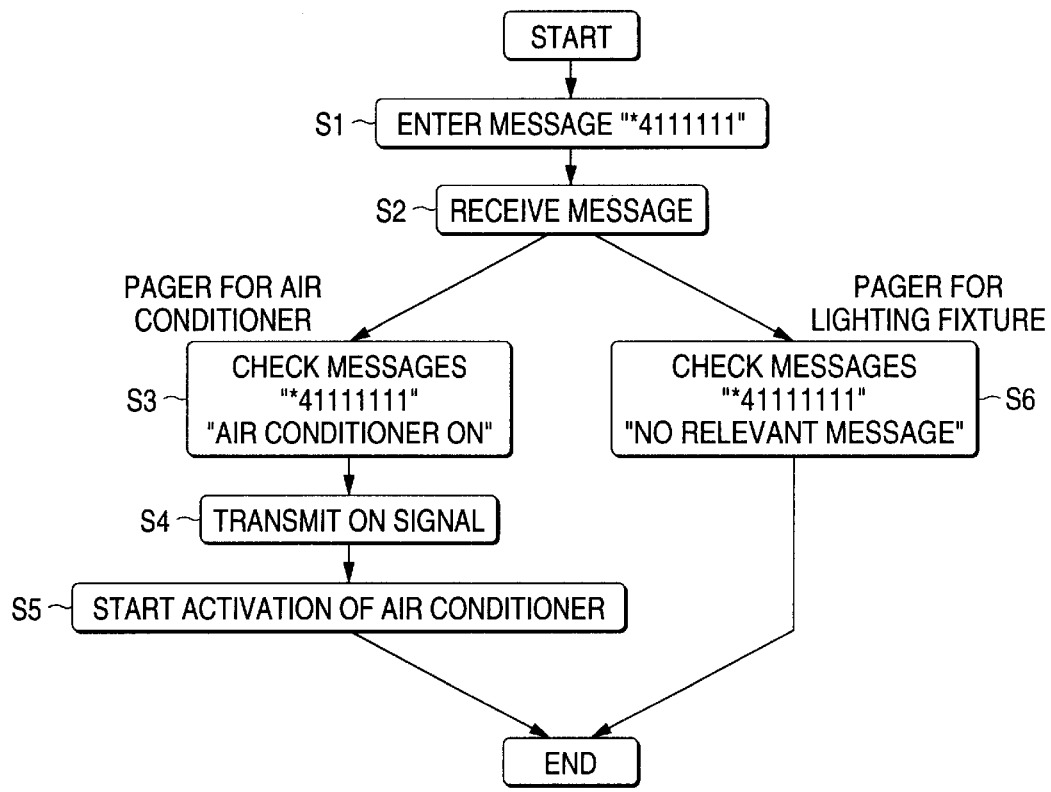
FIG. 7 is a flowchart showing operations performed by the pager according to the second embodiment.
Figure 8:
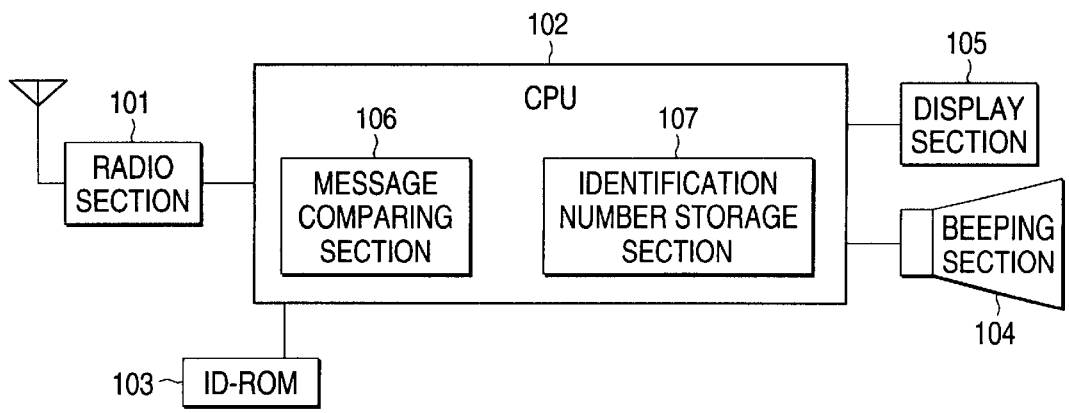
FIG. 8 is a block diagram showing the configuration of a conventional pager.

Specific operations of the pager will now be described by reference to a flowchart shown in FIG. 7.

A first pager to which is attached a memory card storing control information shown in FIG. 6A is connected to the air conditioner, and a second pager to which is attached a memory card storing control information shown in FIG. 6B is connected to the lighting fixture. An identical paging ID is used for both the first and second pagers.

When the user turns on the air conditioner, the following processing steps are performed.

Step 1: A paging ID of the pager is entered by way from a touch-tone telephone, and the entry of the paging ID is followed by entry of "*411" representing an air conditioner and "11111" representing an "ON" control code.

Step 2: Upon receipt of a paging signal from the radio paging system base station, the radio section 11 of each pager demodulates the thus-received paging signal and outputs the thus-demodulated signal to the CPU 12.

Step 3: In the CPU 12 of the first pager, the data comparing section 12a compares the received message with the messages stored in the memory card (see FIG. 6A). The received message matches "*411" (air conditioner) stored in the memory card as well as control code "11111".

Step 4: The external I/F control section 12b of the CPU 12 outputs to the air conditioner an "ON" control signal corresponding to the thus-matched control code by way of the external I/F 17.

Step 5: Upon entry of the control signal by way of the external I/F 31, the air conditioner commences its operations.

Step 6: In contrast, the CPU 12 of the second pager compares the received message with the messages stored in the memory card (see FIG. 6B). "*412" recorded on the memory card differs from the messages stored in the memory card. Hence, even if control codes "11111" (ON) match, the CPU 12 does not perform any paging operations.

A specific controlled device is controlled in such a manner as mentioned above by way of the pager.

When the user wishes to change the second pager from control of the lighting fixture to controlling of the VCR, the memory card for the purpose of controlling a lighting fixture is removed from the second pager. A memory card for the purpose of controlling a VCR (see FIG. 6C) is interchanged with the memory card for the purpose of controlling a lighting fixture. The VCR can be readily and remotely controlled by connection of the second pager to the VCR.

As mentioned above, so long as the pager according to the present embodiment is attached to a device which the user wishes to control, such as an air conditioner, a lighting fixture, or a VCR, the device can be readily controlled. Further, a device to be controlled can be readily changed to another device by replacing the memory card with another memory card.

If the control I/F 17 shown in FIG. 5 is taken as a home automation (HA) terminal and if the connection standard signal for a home automation device is output, activation or deactivation of a device having a terminal compliant with the home automation standard can be readily controlled.

As is evident from the foregoing description, the pager according to the present invention enables selection of a person to be paged or a controlled device to be paged from among a group of persons or controlled devices. Further, the settings or alterations required for selecting a person or controlled device to be paged can be readily made.

By providing the pagers according to the present invention to passengers at the airport, boarding information can be readily and efficiently offered to the passengers according to flights.

Further, if the pagers according to the present invention are arranged so as to correspond to respective controlled devices, such as an air conditioner, a VCR, and a lighting fixture, these devices can be readily controlled. The controlled devices corresponding to the pagers can be readily changed through simple operations.

What is claimed is:

1. A pager with a paging ID common to the others in the same group, the pager comprising:

removable storage means for storing a subgroup ID for identifying a subgroup of the group to which the pager is a member;

data comparing means for comparing a character string included in a received message with the subgroup ID stored in the removable storage means; and operation execution means for commencing an operation on the basis of the result of the comparing operation performed by the data comparing means, wherein said subgroup ID can be changed by interchanging said removable storage means, and further wherein said subgroup ID includes a flight number of an airplane.

* * * * *